(12) United States Patent
Wang

(10) Patent No.: US 8,103,303 B2
(45) Date of Patent: Jan. 24, 2012

(54) SYSTEM AND METHOD FOR ADJUSTING TRANSMISSION POWER OF A COMMUNICATION DEVICE

(75) Inventor: Xiao-Dong Wang, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 179 days.

(21) Appl. No.: 12/699,993

(22) Filed: Feb. 4, 2010

(65) Prior Publication Data

US 2010/0267412 A1  Oct. 21, 2010

(30) Foreign Application Priority Data

Apr. 17, 2009  (CN) .......................... 2009 1 0301649

(51) Int. Cl.
*H04B 7/00* (2006.01)

(52) U.S. Cl. ........ 455/522; 455/69; 455/67.11; 455/517

(58) Field of Classification Search .................. 455/522, 455/69, 67.11, 68, 509, 524, 446, 13.4, 517; 370/311, 343, 335

See application file for complete search history.

(56) References Cited

U.S. PATENT DOCUMENTS

| | | | |
|---|---|---|---|
| 2004/0198235 A1* | 10/2004 | Sano | 455/69 |
| 2005/0282574 A1* | 12/2005 | Li et al. | 455/522 |
| 2008/0175306 A1* | 7/2008 | Matsuoka et al. | 375/146 |

* cited by examiner

*Primary Examiner* — John J Lee
(74) *Attorney, Agent, or Firm* — Altis Law Group, Inc.

(57) ABSTRACT

A method and system for adjusting transmission power of a communication device is provided. The method obtains a transmission power value and a receiving power value of the communication device from a storage system of the communication device, and obtains a power control signal received by the communication device when the call connection between the communication device and a base station via a wireless communication network is established. The method further adjusts the transmission power value according to the power control signal, and calculates a power sum by adding the transmission power value to the receiving power value. In addition, the method modifies the transmission power value according to a difference between the power sum and the receiving power value.

12 Claims, 4 Drawing Sheets

SYSTEM AND METHOD FOR ADJUSTING TRANSMISSION POWER OF A COMMUNICATION DEVICE

BACKGROUND

1. Technical Field

Embodiments of the present disclosure relate to power control systems and methods, and more particularly, to a system and method for dynamically adjusting transmission power of a communication device.

2. Description of Related Art

In a GSM communication system, transmission power of a communication device is controlled by a base station. The base station sends a power control signal to the communication device every 60 ms. When the communication device moves towards to the base station at a high speed, the distance between the communication device and the base station rapidly decreases, and the transmission power of the communication device, is adjusted according to the changed distance. However, the transmission power of the communication device remains unchanged during such 60 ms lapses.

What is needed, therefore, is a system and a method for dynamically adjusting transmission power of the communication device, so as to overcome the limitations described.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
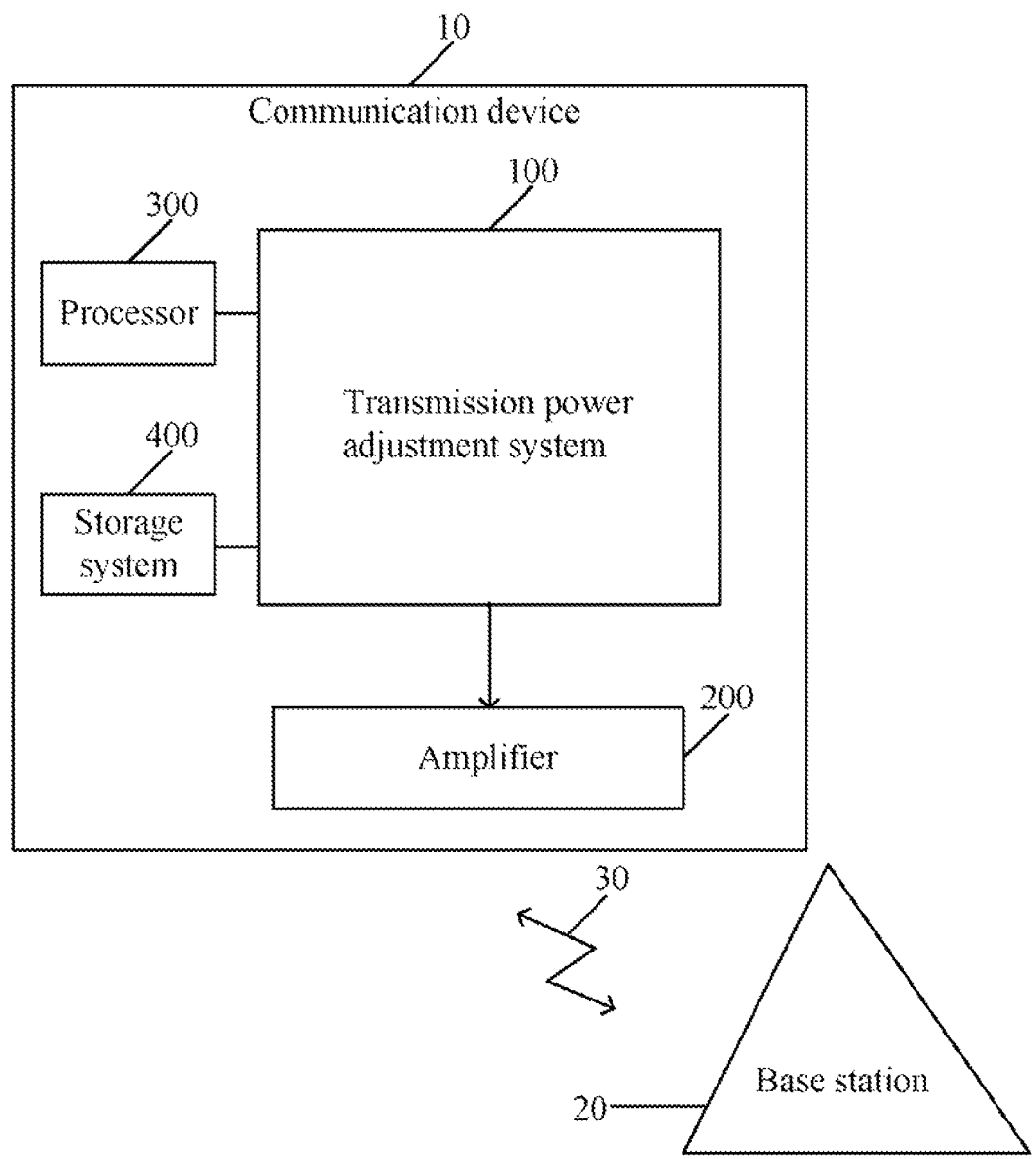
FIG. 1 is schematic of one embodiment of a transmission power adjustment system of a communication device.

FIG. 1 is a schematic of one embodiment of a transmission power adjustment system 100. In one embodiment, the transmission power adjustment system 100 is utilized in a communication device 10. The communication device 10 can communicate with a base station 20 via a wireless communication network 30. The base station 20 can transmit different radio frequency (RF) signals to the communication device 10.

The communication device 10 further includes an amplifier 100, and a storage system 400. The amplifier 100 transmits different RF signals to the base station 20 according to different transmission power (TX) values of the communication device 10. The storage system 400 may store receiving power (RX) values and TX values of the communication device 10. In one embodiment, storage system 400 may be an internal storage device, such as a random access memory (RAM) for temporary storage of information, and/or a read only memory (ROM) for permanent storage of information. In other embodiments, storage system 400 may also be a hard disk drive, an optical drive, a network drive, or storage media.

The transmission power adjustment system 100 is used to dynamically adjust a transmission power of the communication device 10 when the communication device 10 communicates with the base station 20. In one embodiment, one or more computerized codes of the transmission power adjustment system 100 are stored in the storage system 400 or any computer readable storage medium of the communication device 10, and are executed by at least one processor 300. In another embodiment, one or more computerized codes of the transmission power adjustment system 100 may be included in an operating system (OS) of the communication device 10, such as Unix, Linux, Windows-based OS, Mac OS X, or an embedded OS.

Figure 2:
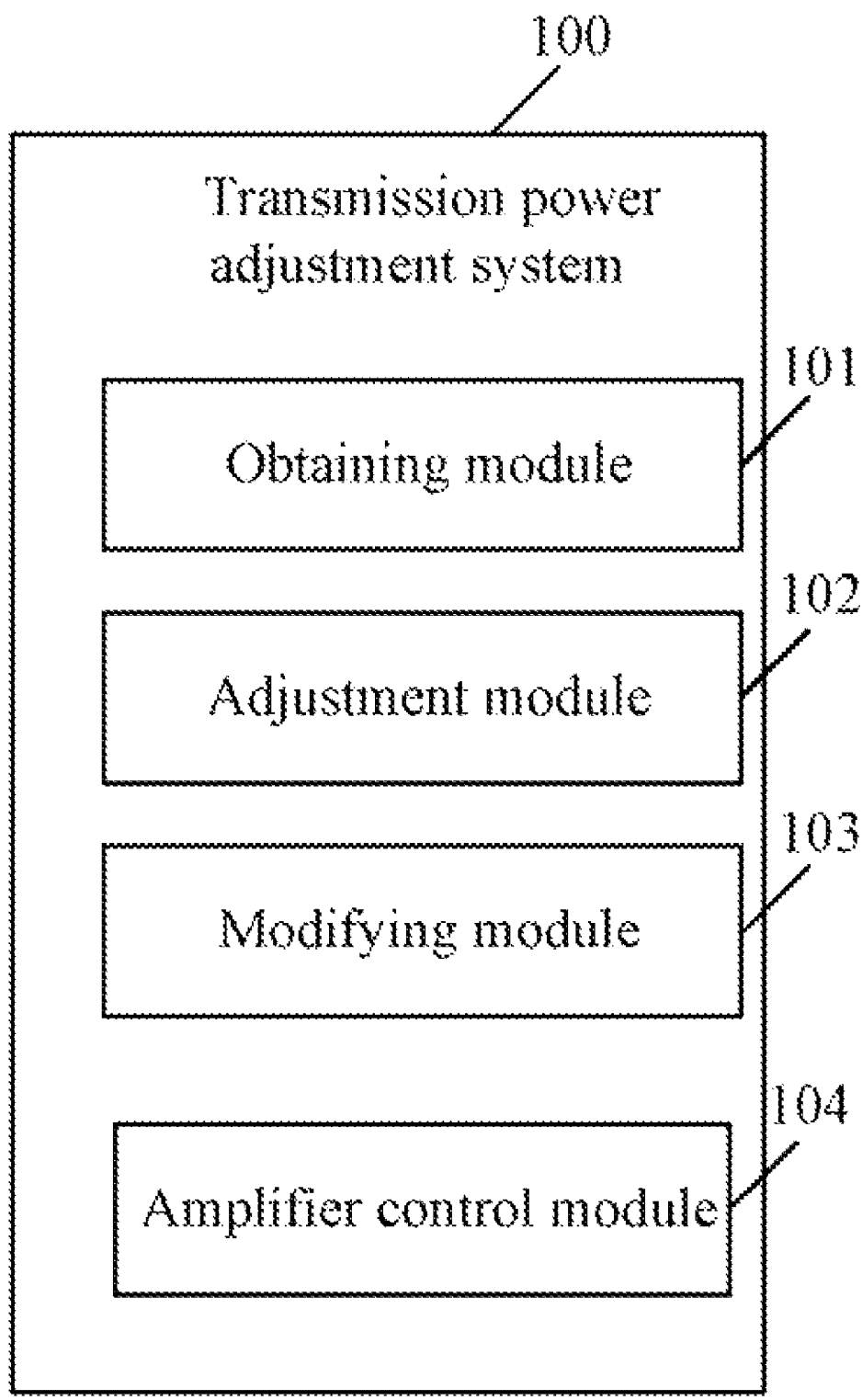
FIG. 2 is a block diagram of function modules of the transmission power adjustment system of FIG. 1.

FIG. 2 is a block diagram of function modules of the transmission power adjustment system 100 in FIG. 1. In one embodiment, the power control system 100 includes an obtaining module 101, an adjustment module 102, a modifying module 103, and an amplifier control module 104. One or more computerized codes of the function modules 101, 102, 103, and 104 may be stored in the storage system 400, and executed by one or more specialized or general purpose processors, such as at least one processor 300. In general, the word "module," as used herein, refers to logic embodied in hardware or firmware, or to a collection of software instructions, written in a program language. In one embodiment, the program language may be Java or C. One or more software instructions in the modules may be embedded in firmware, such as an EPROM. The modules described herein may be implemented as either software and/or hardware modules and may be stored in any type of computer-readable medium or other storage device.

The obtaining module 101 establishes a call connection between the communication device 10 and the base station 20 via the wireless communication network 30. The obtaining module 101 further obtains the RX value and the TX value of the communication device 10 from the storage system 400, and obtains a power control signal transmitted from the base station 20 when the call connection is established. In the embodiment, the RX value and the TX value may be stored in the storage system 400. When a call connection between the communication device 10 and the base station 20 is established, the power obtaining module 101 obtains the RX value and the TX value of the communication device 10 from the storage system 400.

The adjustment module 102 adjusts the TX value according to the power control signal received by the communication device 10. In the GSM communication system, the base station 20 sends a power control signal to the communication device 10 every 60 ms when the call connection is established. In one embodiment, the power control signal may be a power reducing signal, a power balance signal, or a power increasing signal. If the power control signal is a power reducing signal, the power adjustment module 102 reduces the TX value by a first power value, such as 2 dB. If the power control signal is a power balance signal, the power adjustment module 102 balances the TX value. If the power control signal is a power increasing signal, the power adjustment module 102 increases the TX value by a second power value, such as 1 dB, for example. It should be understood that a power reducing signal is defined to be a signal to request the communication device 10 reduce the transmission power, a power balance signal is defined to be a signal to request the communication device 10 balance the transmission power, and a power increasing signal is defined to be a signal to request the communication device 10 increase the transmission power.

The adjustment module 102 calculates a power sum (denoted as a constant "C") by adding the TX value to the RX value. In one embodiment, if the TX value is 20 dBm and the RX value is 30 dBm, then the power sum is 50 dBm. The power sum may be unchanged until a next power control signal is received by the communication device 10.

The modifying module 103 modifies the TX value according to a power difference between the power sum and the RX value. In one embodiment, when the communication device 10 rapidly moves toward to the base station 20, the RX value of the communication device 10 may be changed from 30 dBm to 34 dBm. Then the modifying module 103 modifies the TX value according to the power difference. Depending on the embodiment, the modified TX value is 16 dBm, i.e., TX=C−RX=50 dbm−34 dbm=16 dbm.

The amplifier control module 104 controls the amplifier 200 to transmit RF signals to the base station 20 according to the value of the modified TX. Once the TX value is modified, the amplifier control module 104 controls the amplifier 200 to transmit the RF signals to the base station 20 according to the modified TX value.

Figure 3:
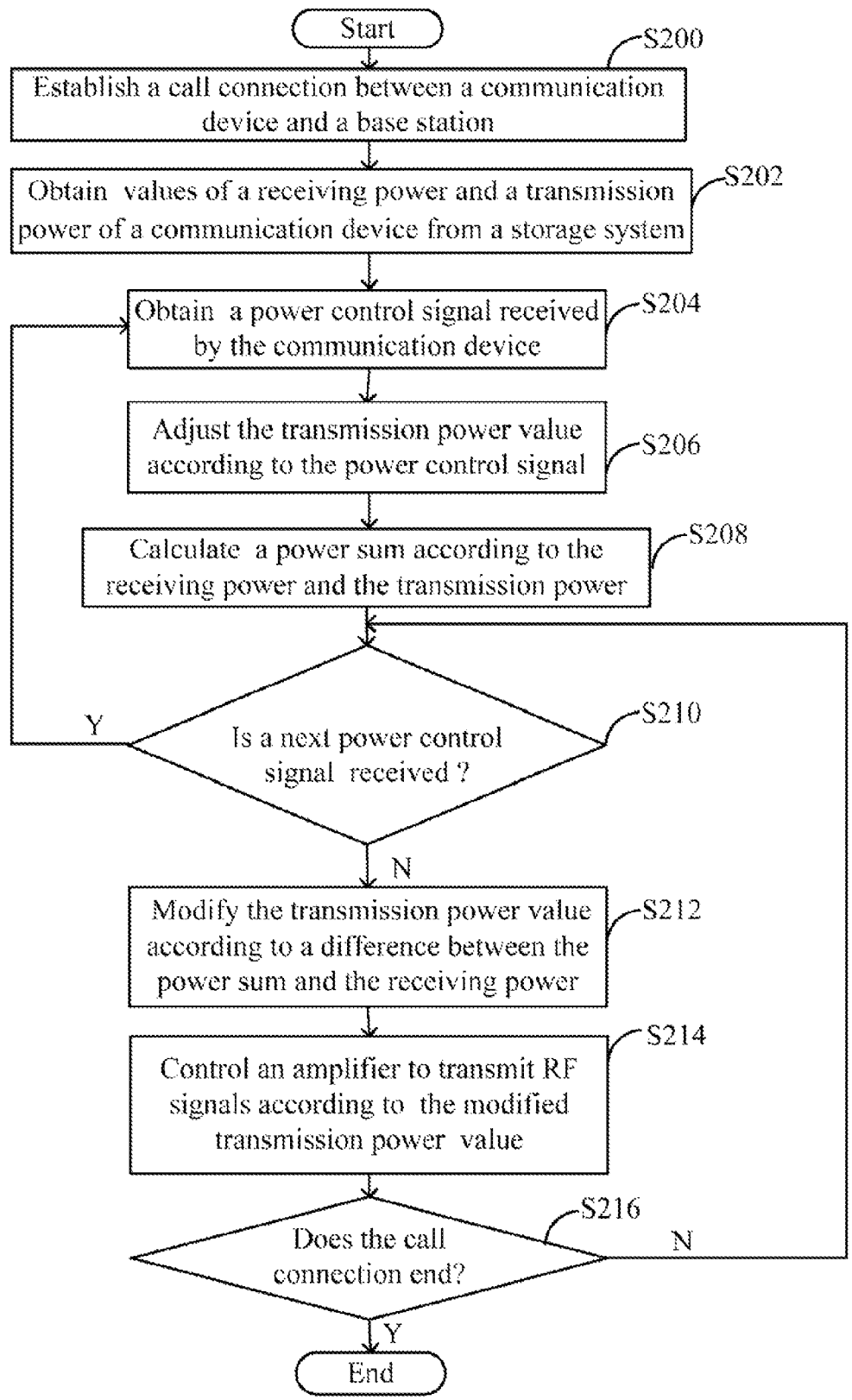
FIG. 3 is a flowchart of one embodiment of a method for adjusting transmission power of a communication device using the system of FIG. 1.

FIG. 3 is a flowchart of one embodiment of a method for adjusting transmission power of the communication device 10 using the system 100 of FIG. 1. Depending on the embodiment, additional blocks may be added, others removed, and the ordering of the blocks replaced.

In block S200, the power obtaining module 101 establishes a call connection between the communication device 10 and the base station 20 via the wireless communication network 30.

In block S202, the power obtaining module 101 obtains a RX value and a TX value of the communication device 10 from the storage system 400. In one embodiment, the RX value and the TX value may be stored in the storage system 400. When the call connection between the communication device 10 and the base station 20 is established, the power obtaining module 101 obtains the RX value and TX value of the communication device 10 from the storage system 400.

In block S204, the power obtaining module 101 obtains a power control signal from the base station 20. In the GSM communication system, the base station 20 sends the power control signal to the communication device 10 every 60 ms when the call connection is established. In one embodiment, the power control signal may include a power reducing signal, a power balance signal, and a power increasing signal.

In block S206, the power adjustment module 102 adjusts the TX value according to the power control signal. Details of block S206 will be provided in FIG. 4 below.

In block S208, the power modifying module 103 calculates a power sum (denoted as a constant "C") by adding the TX value to the RX value. Depending on the embodiment, if the TX value is 20 dBm and the RX value is 30 dBm, then the power sum is 50 dBm. The power sum may be unchanged until a next power control signal is received by the communication device 10.

In block S210, the modifying module 103 determines whether the communication device 10 receives a next power control signal from the base station 20. If the communication device 10 does not receive a next power control signal, the flow proceeds to block S212. Otherwise, if the communication device 10 receives a next power control signal, the flow returns to block S204.

In block S212, the modifying module 103 modifies the TX value according to a power difference between the constant C and the RX value. In the embodiment, when the communication device 10 rapidly moves toward to the base station 20, the RX value of the communication device 10 may be changed from 30 dBm to 34 dBm. Next, the modifying module 103 modifies the TX value according to the power difference. In this embodiment, the modified TX value is 16 dBm (i.e., TX=C−RX=50 dbm−34 dbm=16 dbm).

In block S214, the amplifier control module 104 controls the amplifier 200 to transmit RF signals to the base station 20 according to the modified TX value. Once the TX value of the communication device 10 is modified, the amplifier control module 104 controls the amplifier 200 to transmit the RF signals to the base station 20 according to the modified TX value.

Figure 4:
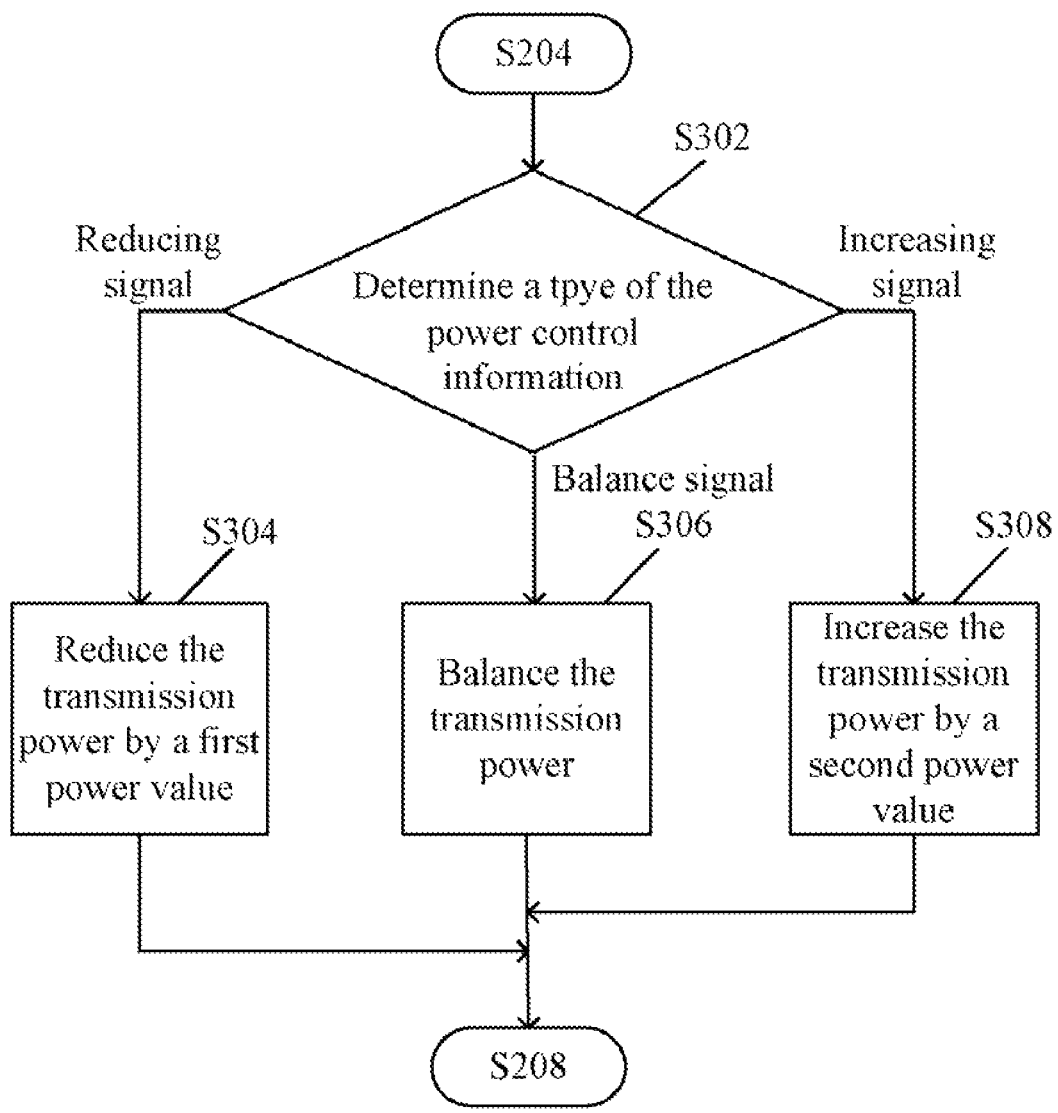
FIG. 4 is a flowchart of a detailed description of block S206 in FIG. 3.

FIG. 4 is a flowchart of a detailed descriptions of block S206 in FIG. 3. In block S302, the power adjustment module 102 determines the type of power control signal. In this embodiment, if the power control signal is a power reducing signal, the proceeds to block S304; if the power control signal is a power balance signal, the proceeds to block S306; if the power control signal is a power increasing signal, the proceeds to block S308.

In block S304, the power adjustment module 102 reduces the TX value by a first power value, such as 2 dB, for example. In block S306, the power adjustment module 102 balances the TX value. In block S308, the power adjustment module 102 increases the TX value by a second power value, such as 1 dB.

All of the processes described below may be embodied in, and fully automated via, functional code modules executed by one or more general-purpose computers or processors. The code modules may be stored in any type of computer-readable medium or other storage device. Some or all of the methods may alternatively be embodied in specialized computer hardware or communication apparatus.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A communication device in communication with a base station via a wireless communication network, the communication device comprising:
  a processor;
  a storage device comprising one or more programs, the one or more programs comprising:
   an obtaining module operable to establish a call connection between the communication device and the base station via the wireless communication network, obtain a transmission power value and a receiving power value of the communication device from a storage system of the communication device, and obtain a power control signal transmitted from the base station when the call connection is established;
   an adjustment module operable to adjust the transmission power value according to the power control signal, and calculate a power sum by adding the transmission power value to the receiving power value;
   an modifying module operable to modify the transmission power value according to a difference between the power sum and the receiving power value; and
   an amplifier control module operable to control an amplifier of the communication device to transmit different radiofrequency signals according to the modified transmission power value.

2. The system according to claim 1, wherein the power control signal is a power reducing signal, a power balance signal, or a power increasing signal.

3. The system according to claim 2, wherein the power adjustment module reduces the transmission power value by a first power value if the power control signal is the power reducing signal, balances the transmission power value if the power control signal is the power balance signal, or increases the transmission power value by a second power value if the power control signal is the power increasing signal.

4. The system according to claim 1, wherein the power sum is unchanged until a next power control signal received by the communication device.

5. A method for adjusting transmission power of a communication device, the method comprising:
  establishing a call connection between the communication device and a base station via a wireless communication network,
  obtaining a transmission power value and a receiving power value of the communication device from a storage system of the communication device, and obtaining a power control signal received by the communication device when the call connection is established;
  adjusting the transmission power value according to the power control signal;
  calculating a power sum by adding the transmission power value to the receiving power value; and
  modifying the transmission power value according to a difference between the power sum and the receiving power value; and
  controlling an amplifier of the communication device to transmit different radiofrequency signals according to the modified transmission power value.

6. The method according to claim 5, wherein the power control signal is a power reducing signal, a power balance signal, or a power increasing signal.

7. The method according to claim 6, wherein the adjusting block comprises:
  reducing the transmission power value by a first power value if the power control signal is the power reducing signal;
  balancing the transmission power value if the power control signal is a power balance signal; or
  increasing the transmission power value by a second power value if the power control signal is a power increasing signal.

8. The method according to claim 5, wherein the power sum is unchanged until a next power control signal received by the communication device.

9. A non-transitory storage medium having stored thereon instructions that, when executed by a processor of a communication device, causing the processor to perform a method for adjusting transmission power of the communication device, the method comprising:
  establishing a call connection between the communication device and a base station via a wireless communication network,
  obtaining a transmission power value and a receiving power value of the communication device from a storage system of the communication device, and obtaining a power control signal received by the communication device when the call connection is established;
  adjusting the transmission power value according to the power control signal;
  calculating a power sum by adding the transmission power value to the receiving power value; and
  modifying the transmission power value according to a difference between the power sum and the receiving power value; and
  controlling a amplifier of the communication device to transmit different radiofrequency signals according to the modified transmission power value.

10. The medium according to claim 9, wherein the power control signal is a power reducing signal, a power balance signal, or a power increasing signal.

11. The medium according to claim 10, wherein the adjusting block comprises:
  reducing the transmission power value by a first power value if the power control signal is the power reducing signal;
  balancing the transmission power value if the power control signal is a power balance signal; or
  increasing the transmission power value by a second power value if the power control signal is a power increasing signal.

12. The medium according to claim 9, wherein the power sum is unchanged until a next power control signal received by the communication device.

* * * * *